No. 665,305. Patented Jan. 1, 1901.
A. F. BERRY.
ELECTRICAL TRANSFORMER.
(Application filed July 23, 1900.)
(No Model.) 2 Sheets—Sheet 1.
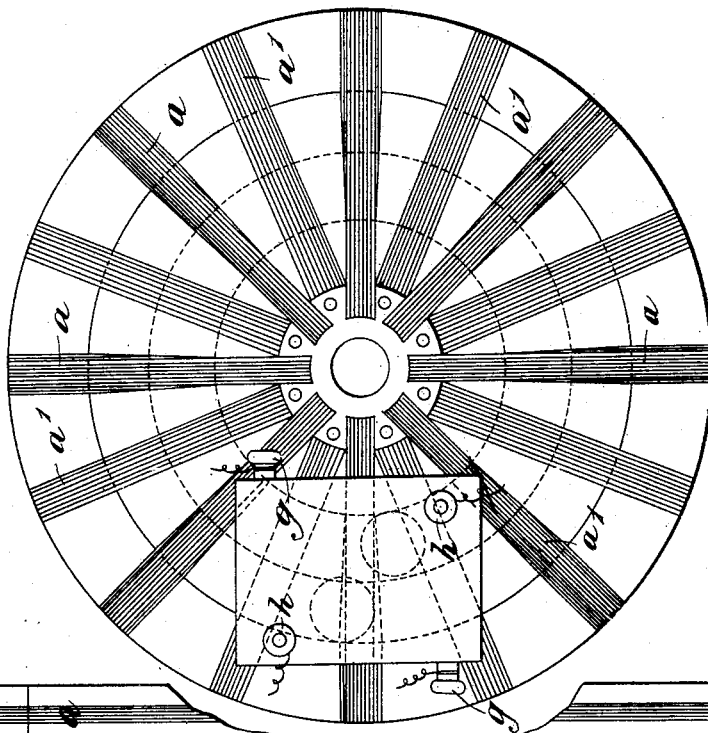
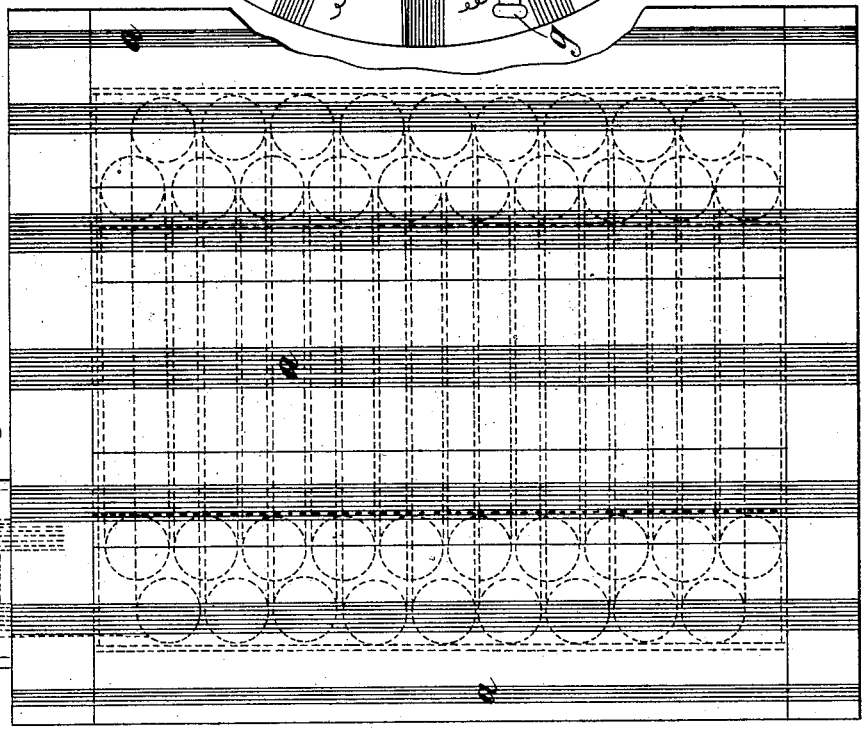

No. 665,305. Patented Jan. 1, 1901.
A. F. BERRY.
ELECTRICAL TRANSFORMER.
(Application filed July 23, 1900.)
(No Model.) 2 Sheets—Sheet 2.
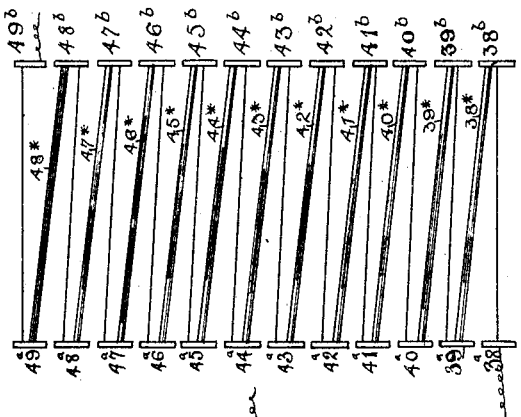
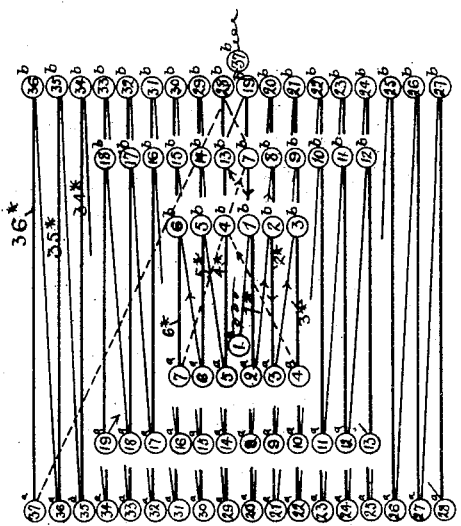
Witnesses.
Geo. E. Frich.
Chas. R. Wright Jr.
Inventor.
A. F. Berry.
by A. S. Pattison
atty
THE NORRIS PETERS CO., PHOTO-LITHO., WASHINGTON, D. C.

UNITED STATES PATENT OFFICE.

ARTHUR FRANCIS BERRY, OF LONDON, ENGLAND.

ELECTRICAL TRANSFORMER.

SPECIFICATION forming part of Letters Patent No. 665,305, dated January 1, 1901.

Application filed July 23, 1900. Serial No. 24,618. (No model.)

*To all whom it may concern:*

Be it known that I, ARTHUR FRANCIS BERRY, a subject of the Queen of Great Britain and Ireland, residing at Ealing, London, in the county of Middlesex, England, have invented Improvements in Electrical Transformers, of which the following is a specification.

In the manufacture of electrical transformers it has heretofore been usual to construct the primary and secondary windings of two or more independent insulated conductors that have been separately wound in place in the transformer or have been formed into separate coils that have afterward been placed in the desired position in the transformer. These modes of construction are costly and slow and, moreover, require considerable skill and care to insure satisfactory results.

Now this invention has for its object to enable electrical transformers to be constructed in a cheaper, quicker, and easier manner than heretofore and with less dependence upon skilled labor. For this purpose the primary and secondary windings of an electrical transformer are made from a cable composed of conductors that are insulated from each other and are connected together at their ends by suitable coupling devices in such manner that some of the insulated conductors will be connected together in series or in parallel to form the primary winding or windings and the remainder will be connected together in series or in parallel to form the secondary winding or windings, the ratio between the number of turns comprising the sets of conductors forming the primary and secondary windings, respectively, being so designed as to give the desired ratio of electrical transformation. The cross-sectional shape of the cable and the number and arrangement of the insulated conductors of which it is composed and the method of insulation adopted can be variously modified as may be desired. Conveniently the cable may be of circular section, the insulated conductors to form one winding—say the primary winding—being arranged to form the central portion of the cable and inclosed within insulating material on the outside of which the conductors to form the other winding—say the secondary winding—are laid and then covered by an outer covering of insulating material, the primary and secondary sets of conductors being thus arranged concentrically one within the other. In this case each of the outer insulated conductors may be of segmental form and be composed of a number of bare wires or strips arranged together in parallel. The cables may, however, be of square, rectangular, or other section, if desired.

A length of cable such as described can be readily formed into a coil either *in situ* in or on a transformer core or cores or separately therefrom, and the ends of the conductors to form each primary and secondary winding can be connected together by coupling or connecting devices of various kinds, so as to place the conductors of each set in series or multiple series with each other and produce the desired number of turns or convolutions in either or both the primary and secondary coils.

Primary and secondary windings formed by a cable, as herein described, may advantageously be used in the construction of transformers having iron cores of the kind described and shown in the specification of a former patent granted to me—viz., No. 639,505.

Figures 1 and 2 of the accompanying illustrative drawings show, respectively, in side elevation and plan a transformer the iron core of which is formed of laminated-iron plates built up and arranged as described in the specification of my said former patent No. 639,505, and the winding of which is composed of a length of cable of the kind herein referred to. Fig. 3 shows in cross-section and to a larger scale than Figs. 1 and 2 one form which the cable may take. Figs. 4 and 5 are diagrams showing how the ends of the conductors of which the cable is composed may be coupled together to form primary and secondary windings. Fig. 6 is a separate view showing the detachable connection of the junction-pieces.

In the example shown the windings of the transformer consist of a single length of cable arranged in two layers that extend through rectangular holes in the laminated-metal plates $a\ a'$, constituting the iron core of the transformer, the cable being composed of thirty-seven inner conductors of circular section that are numbered, respectively, from 1 to 37, forming the central portion of the core, and are designed to serve as the primary winding or windings, and twelve outer conductors of segmental shape that are numbered, respectively, from 38 to 49 and are designed to serve as the secondary winding or windings. Each of the inner conductors 1 to 37 is separately insulated, and the annular rows of such conductors are insulated from each other and from the central conductor by interposed layers $b$ of suitable insulating material, so as to effectually separate from each other adjacent conductors between which a considerable difference of electrical potential may exist. Each of the outer conductors 38 to 49 is also separately insulated, and the whole of them are insulated from the inner conductors by interposed insulating material $c$ and covered by an outer layer $d$ of insulating material. The ends of the several conductors in the example shown are led into a junction-box made in two parts $e$ and $f$, the ends of the inner conductors 1 to 37 being led into and connected up in the lower part $e$ of the said box, so as to place the several conductors in series with each other and form a single primary winding, and the ends of the outer conductors being led into and connected up in any desired manner in the upper part $f$ of the box to form the secondary winding or windings.

Fig. 4 shows, diagrammatically, how the two sets of ends (marked, respectively, $1^a$ to $37^a$ and $1^b$ to $37^b$) of the inner conductors 1 to 37 may be connected together. In this case the end $1^a$ of the central conductor 1 is connected to a terminal $g$, by which it can be connected to one pole of a source of alternating-current supply. The other end $1^b$ of this conductor is connected by a junction-piece $1^*$ to the end $2^a$ of the conductor 2, the opposite end $2^b$ of which is similarly connected by a junction-piece $2^*$ to the end $3^a$ of the conductor 3, and so on, so that the whole of the conductors 1 to 37 are connected in series, the end $37^b$ of the last conductor 37 being connected to another terminal $g'$, by which it can be connected to the opposite pole of the said source of alternating-current supply. When the ends of the conductors 1 to 37 have been thus coupled together, which may be done by electric welding, the lower part $e$ of the box may be filled with a suitable insulating material, either liquid or solid. The two sets of ends (marked, respectively, $38^a$ to $49^a$ and $38^b$ to $49^b$) of the outer conductors 38 to 49 and located in the upper part $f$ of the junction-box may be similarly connected together by junction-pieces $38^*$ to $48^*$, as shown, diagrammatically, in Fig. 5, when it is desired to couple the whole of the outer conductors in series to form a single secondary winding the ends of which are connected to terminals $h$ $h$. The junction-pieces $38^*$ to $48^*$ may be detachably connected to the ends of the conductors 38 to 49, so as to admit of such conductors being readily coupled up in any other desired order, so as to form two or more secondary windings, as may be desired.

When desired, a safety device—for example, in the form of a metallic tape, screen, or shield $k$, Fig. 3, adapted to be earthed—may be inclosed in the layer $c$ of insulating material between the primary and secondary windings, so as to extend longitudinally of and within the cable.

What I claim is—

1. An electrical transformer comprising an iron core composed of a number of laminated-iron plates, a length of cable extending through holes in said plates and composed of separately-insulated conductors, and groups of junction-pieces connecting the said conductors in the desired order to form combined primary and secondary windings, substantially as described.

2. An electrical transformer comprising an iron core composed of a number of built-up laminated-iron plates arranged radially around a center and each having a large hole therethrough, a length of cable wound to form a coil extending through the holes in said plates and composed of two sets of separately-insulated conductors and junction-pieces connecting the said conductors in the desired order to form primary and secondary windings, substantially as described.

3. An electrical transformer comprising an iron core composed of a number of built-up laminated-iron plates arranged radially around a center and each having a large hole therethrough, and a length of cable wound to form a coil extending through the holes in said plates and composed of two concentrically-arranged sets of separately-insulated conductors coupled up to form primary and secondary windings, substantially as described.

4. An electrical transformer comprising an iron core composed of a number of built-up laminated-iron plates arranged radially around a center and each having a large hole therethrough, and a length of cable wound to form a coil extending through the holes in said plates and composed of two concentrically-arranged sets of separately-insulated conductors, the conductors in the inner set being arranged in annular rows around a center one, and the conductors in the outer set being annularly arranged around the inner ones, concentric layers of insulating material between the several annular rows of conductors, and junction-pieces coupling up the conductors of the two sets to form the desired primary and secondary windings, substantially as described.

5. In an electrical transformer, a cable composed of sets of insulated conductors connected up to form primary and secondary windings, and a safety or earthing device arranged longitudinally of and within said cable and between the said windings, substantially as described.

6. In an electrical transformer, a cable composed of concentric sets of insulated conductors connected up to form primary and secondary windings, and a metallic safety or earthing device arranged longitudinally of and within said cable and inclosing the inner or primary winding or windings and located between the two sets of conductors, substantially as described.

7. An electrical transformer comprising a laminated-iron core, a length of cable wound on said core and composed of two sets of separately-insulated conductors, a junction-box located on the top of said transformer and made in parts into which the ends of the sets of conductors are respectively led, and groups of junction-pieces connecting the ends of said conductors in the respective parts of said junction-box to form the required primary and secondary windings, substantially as described.

Signed at 77 Cornhill, in the city of London, England, this 11th day of July, 1900.

ARTHUR FRANCIS BERRY.

Witnesses:
 WM. O. BROWN,
 EDMUND S. SNEWIN.